(No Model.)
G. F. SIMONDS.
BALL BEARING.
No. 449,956. Patented Apr. 7, 1891.
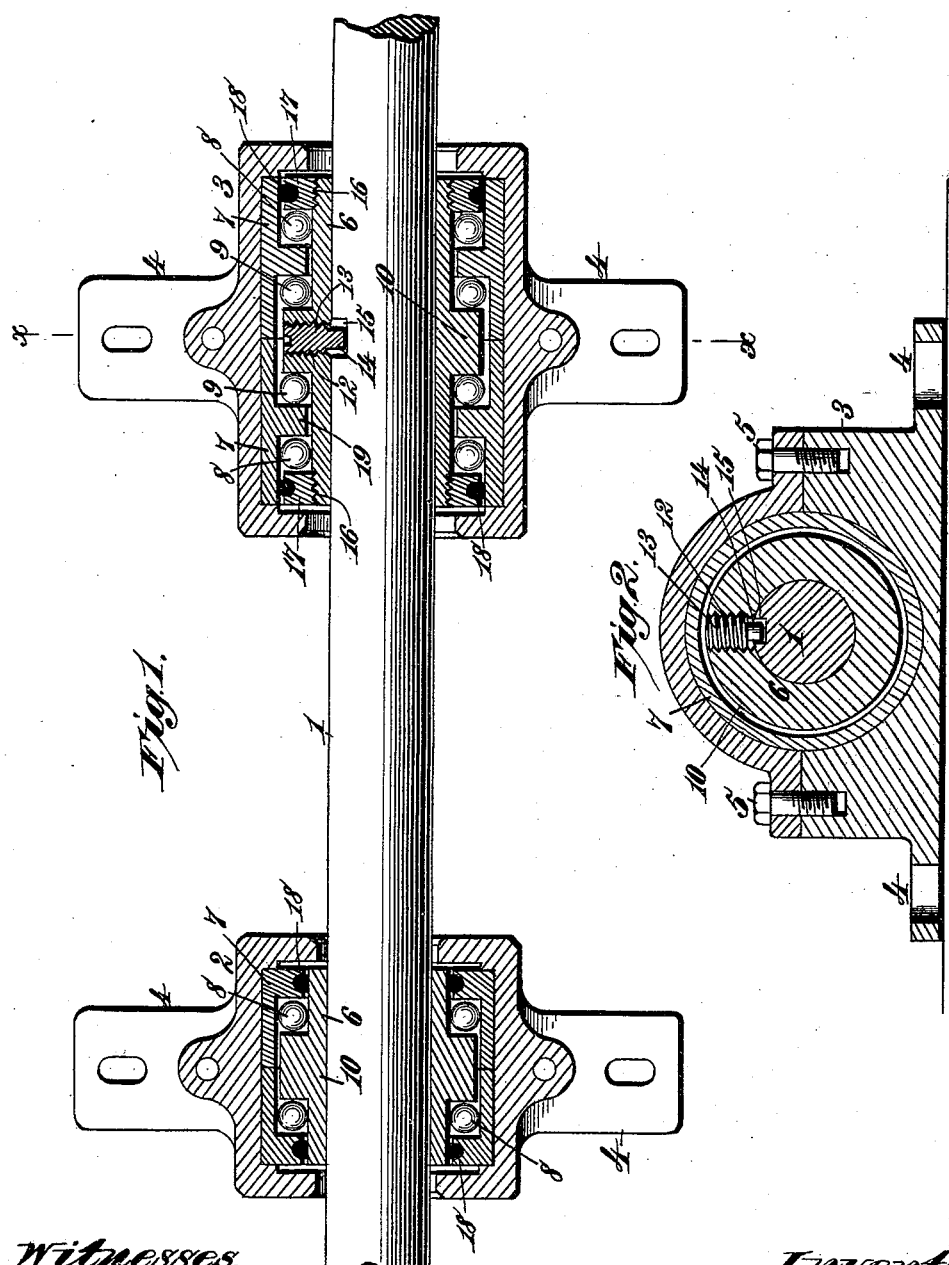
Witnesses.
Robert Everitt,
J. A. Rutherford.
Inventor.
George F. Simonds.
By James L. Norris.
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 449,956, dated April 7, 1891.

Application filed August 2, 1890. Serial No. 360,808. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

This invention relates to that type of ball-bearings wherein annular sets of spherical rollers or balls are employed to sustain and support radial pressure or weight, and other annular sets of similar rollers or balls serve to resist or counteract endwise thrusts of a shaft or journal, as in the several Letters Patent issued to me August 19, 1890.

The object of the present invention is to provide novel means whereby the parts are adapted for a through-shaft, and dust, dirt, or other foreign matter is effectually excluded from each end of the ball-bearing.

The invention also has for its object to provide novel means for connecting the tubular pieces or sleeve with the shaft or journal in such manner that they rotate together.

To accomplish these objects my invention involves the features of construction, the combination or arrangement of parts, and the principles of operation hereinafter described and claimed, reference being had to the accompanying drawings, in which—

Figure 1 is a sectional plan view showing a shaft supported in ball-bearings constructed in accordance with my invention. Fig. 2 is a sectional view taken on the line $x$ $x$, Fig. 1.

In order to enable those skilled in the art to make and use my invention, I will now describe the same in detail, referring to the drawings, wherein—

The numeral 1 indicates a shaft supported at different points by ball-bearings located in boxes 2 and 3, such boxes being provided with flanges 4 or other means by which to secure them in a fixed position on a suitable support. The boxes are composed of two sections, the lower one of which is provided with the flanges 4, while the upper one is detachably secured by bolts 5 or other devices for the purpose of permitting it to be removed and replaced when occasion requires.

The ball-bearing in the box 3 comprises a tubular piece or sleeve 6, rings or annular pieces 7, and annular sets of spherical rollers or balls 8 and 9. The tubular piece or sleeve 6 is formed intermediate its ends with an annular rib or collar 10, the side walls or surfaces of which are located at right angles to the axis of the shaft, and this rib or collar is formed or provided with a screw-threaded orifice 12 to receive the screw-threaded plug or bolt 13, having its inner end portion 14 plane or smooth, and entering a recess 15 in the shaft, in such manner that the tubular piece or sleeve 6 is caused to revolve with the shaft, while the latter can, if desired, slightly move lengthwise by reason of the recess 15 being constructed slightly greater in length than in width. This peculiar construction is particularly designed for the armature-shafts of dynamo-machines where a slight longitudinal movement of the shaft is desirable.

The extremities of the tubular piece or sleeve 6 are provided with external screw-threads 16, with which are engaged screw-threaded rings 17, having their external peripheries formed with annular packing-grooves 18 for the purpose of containing packings of any material suitable for the conditions required to exclude dust, dirt, or other foreign matter from the ball-bearing at each end thereof.

The annular packings in the packing-grooves bear against the internal surfaces of the rings or annular pieces 7 to produce tight joints between the parts, and the rings or annular pieces are each provided with an annular rib or collar 19 projecting inwardly toward the shaft.

In the channels or spaces between the screw-rings 17 and the ribs or collars 19 are arranged the annular sets of spherical rollers or balls 8, while between the parallel side surfaces or walls of the rib or collar 10 of the tubular piece or sleeve 6 and the ribs or collars 19 of the rings or annular pieces are arranged the annular sets of spherical balls or rollers 9. The spherical balls or rollers 8 have no pressure-supporting contact with the adjacent parallel surface of the rings 17 and the collars 19, but have a pressure-supporting contact with the tubular piece or sleeve 6 and the internal surfaces of the rings or annular pieces 7, in consequence of which such spherical rollers or balls operate to sustain or support radial pressure or weight.

The spherical rollers or balls 9 have no pressure-supporting contact with the internal surface of the rings or annular pieces, but bear against the parallel adjacent surfaces of the rib or collar 10 on the tubular piece or sleeve 6 and the ribs or collars 19 on the ridge or annular pieces 7 for the purpose of resisting or counteracting endwise thrusts of the shaft.

By the construction described and shown the tubular piece or sleeve 6 is connected with the shaft in a practical and economical manner, while dust, dirt, or other foreign matter is effectually excluded from each end of a ball-bearing adapted for a through shaft.

The box 2 is constructed substantially the same as described with reference to the box 3; but the rings which contain the annular packing-grooves 18, instead of being screw-threaded and applied to the tubular piece or sleeve 6, are formed integral with or otherwise provided on the rings or annular pieces 7, while the annular sets of spherical balls or rollers 8 are located in the channels or spaces between the grooved and packed flanges and the annular rib or collar 10 on the tubular piece or sleeve 6, the main object of this construction being to provide a supplemental ball-bearing for supporting the shaft 1 to enable the latter to run at high speed, while the friction is materially and largely reduced.

By the construction described and shown the parts are adapted for a through-shaft, and dust, dirt, or other foreign matter is effectually excluded from each end of the ball-bearing, and the tubular piece or sleeve is detachably connected with the shaft by a simple and economical contrivance or device.

I have exhibited two independent ball-bearings on the same shaft, as such are desirable in dynamo-electric machines; but I do not herein claim the construction of ball-bearing contained in the box 2.

Having thus described my invention, what I claim is—

1. A ball-bearing for a through-shaft, comprising a tubular piece or sleeve having an annular rib or collar intermediate its ends, rings or annular pieces surrounding the tubular piece or sleeve, a ring located at each end of the tubular piece or sleeve and formed in its periphery with a circular packing-groove containing a packing for excluding dust or dirt, and annular sets of spherical rollers or balls located between the tubular piece or sleeve and the rings or annular pieces, substantially as described.

2. A ball-bearing comprising an annular piece or sleeve having a surrounding rib or collar provided with a screw-threaded orifice, a screw plug or bolt located in said orifice and adapted to engage a shaft, rings or annular pieces surrounding the tubular piece or sleeve, a ring located at each end of the tubular piece or sleeve and formed in its periphery with an annular packing-groove containing a packing for excluding dust or dirt, and annular sets of spherical rollers or balls interposed between the tubular piece or sleeve and the rings or annular pieces, substantially as described.

3. A ball-bearing comprising a tubular piece or sleeve having screw-threaded ends and a surrounding rib or collar located intermediate its ends and containing a screw-threaded orifice, a screw plug or bolt located in said orifice and adapted to engage the shaft, a screw-threaded ring arranged on each end of the tubular piece or sleeve and formed in its periphery with an annular packing-groove containing a packing for excluding dust or dirt, rings or annular pieces provided with annular ribs or collars, and annular sets of spherical rollers or balls interposed between the tubular pieces or sleeve and the rings or annular pieces for sustaining or supporting radial pressure or weight and resisting or counteracting endwise thrusts of the shaft, substantially as described.

In testimony whereof I have affixed my signature in presence of two witnesses.

GEO. F. SIMONDS.

Witnesses.
JAMES A. RUTHERFORD,
ALBERT H. NORRIS.